US008528006B1

(12) United States Patent
Doyon et al.

(10) Patent No.: US 8,528,006 B1
(45) Date of Patent: *Sep. 3, 2013

(54) METHOD AND APPARATUS FOR PERFORMING REAL-TIME COMMANDS IN A NON REAL-TIME OPERATING SYSTEM ENVIRONMENT

(75) Inventors: Michel Doyon, Lachine (CA); Stephane Laplante, Verdun (CA); Stephane Maurice, Montreal (CA)

(73) Assignee: Matrox Electronic Systems, Ltd., Dorval, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/368,748

(22) Filed: Feb. 8, 2012

Related U.S. Application Data

(63) Continuation of application No. 10/662,293, filed on Sep. 16, 2003, now Pat. No. 8,117,624.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............................................................ 719/323

(58) Field of Classification Search
USPC ............................................................ 719/323
See application file for complete search history.

(56) References Cited

U.S. PATENT DOCUMENTS

| 5,530,815 A * | 6/1996 | Nabekura et al. ............ 712/227 |
| 5,721,922 A * | 2/1998 | Dingwall ...................... 718/103 |
| 6,470,071 B1 * | 10/2002 | Baertsch et al. ................ 378/62 |
| 7,234,144 B2 * | 6/2007 | Wilt et al. ..................... 718/104 |

* cited by examiner

*Primary Examiner* — Emerson Puente
*Assistant Examiner* — Kimbleann Verdi
(74) *Attorney, Agent, or Firm* — Norton Rose Fulbright Canada LLP

(57) ABSTRACT

A method and apparatus is disclosed for performing real-time execution of a plurality of commands in a non real-time operating system environment using a driver, running at the privileged level and which comprises a command dispatcher, receiving a plurality of commands provided by a user application, and a command queue storing the plurality of commands provided by the user application for further providing the plurality of commands to a target unit for execution.

22 Claims, 7 Drawing Sheets

METHOD AND APPARATUS FOR PERFORMING REAL-TIME COMMANDS IN A NON REAL-TIME OPERATING SYSTEM ENVIRONMENT

CROSS-REFERENCE TO RELATED APPLICATIONS

The present application is a continuation under 35 U.S.C. §120 of U.S. patent application Ser. No. 10/662,293 filed on Sep. 16, 2003, the contents of which are hereby incorporated by reference.

TECHNICAL FIELD

This invention relates to the field of time-critical computation using conventional operating systems.

BACKGROUND OF THE INVENTION

Real-time operating systems are designed for time sensitive operations where an action, in response to an event, is performed within a predetermined range of time. Such operating systems are of great advantage in various fields such as control, communication, navigation, etc.

Most operating systems are however non real-time operating systems. Under such operating systems, each command is given a certain priority but it is not possible to guarantee that the command will be executed within a predetermined predictable time range. Such operating systems are therefore usually not used for mission/life critical operations.

It is however very desirable to be able to execute certain commands, such as video data acquisition processing, data transfer, etc., within a predetermined time range and without having to install a new operating system. Furthermore, users that need real-time execution are usually very reluctant or cannot use commercial non real-time operating systems for their application.

It is an object of the invention to provide a method and apparatus that will overcome the above-identified drawbacks.

SUMMARY OF THE INVENTION

It is an object of the invention to provide a method for providing execution of real-time commands in a non real-time operating system environment.

Yet another object of the invention is to provide an apparatus for providing execution of real-time commands in a non real-time operating system environment.

According to a first aspect of the invention, there is provided, in a computer system, a method for providing improved real time command execution in a non real time operating system, executing at least one application at a user mode level of the computer system, providing from the application a sequence of asynchronous commands to be executed in real time, storing the sequence of asynchronous commands in a command queue to be accessible from a privileged mode level of the computing system and implementing each command of the stored sequence of asynchronous commands.

Yet according to a further aspect of the invention, there is provided, in a computer system, a driver for providing improved real time command execution in a non real time operating system, comprising a command queue comprising a sequence of asynchronous commands to be handled in real time, a command dispatcher operating at a kernel mode level and providing a command of the sequence of asynchronous commands to a target unit in response to an "end of command execution" signal generated in said computer system.

It is yet another aspect of the present invention to provide a computer software product for real-time use in a non-real-time operating system environment, allowing the use of a friendly user-interface to program a sequence of synchronous or asynchronous commands at a user mode level, to be stored and executed in real-time at a kernel mode level.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 2:
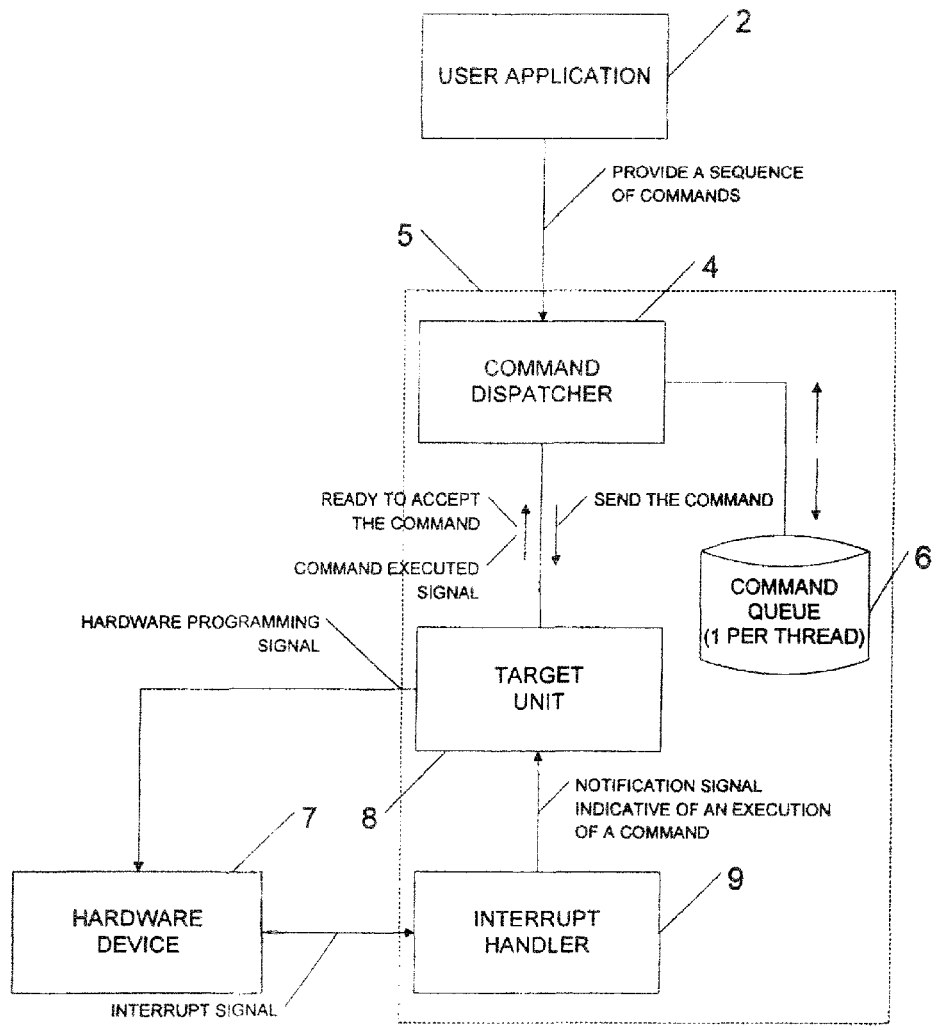
FIG. 2 is a block diagram which shows an embodiment of the invention; a driver comprises a command dispatcher and a command queue.

Now referring to FIG. 2, there is shown an embodiment of the invention.

As explained below, a driver 5 is used in order to execute a plurality of commands in real time, in a non-real time operating system environment. Such non-real time operating system environment may be one of Microsoft Windows NT™, Microsoft Windows 2000™, Microsoft Windows XP™ and Linux for instance. The non-real time operating system environment may run on an Intel™ compatible processor or the like.

Figure 1:
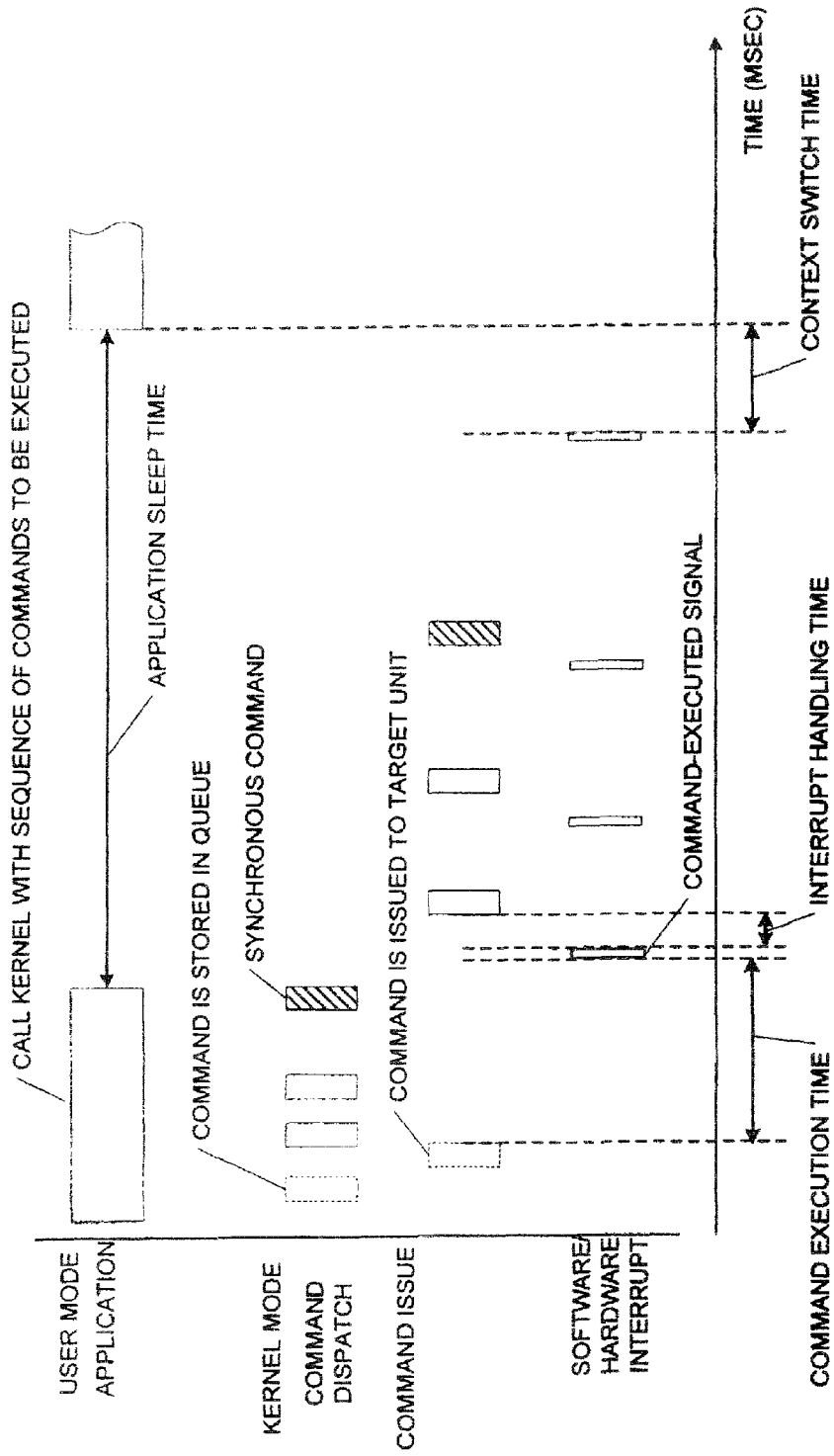
FIG. 1 is a diagram which shows an example where the invention is advantageously used for image data processing.

The difficulty in providing a real-time response in an operating system such as Windows™ is illustrated in the timing diagram of FIG. 1. The application is allowed to execute in time slices that begin and end at points in time determined by priorities within the operating system. Software and hardware interrupts can cause the operating system to give an application CPU time more urgently or more frequently, but it is difficult in balancing the needs of various applications to ensure that an application will always be able to perform its desired tasks when required. Without the invention, the interrupts from the hardware would need to cause the application program to be involved before the next interrupt is processed. The application would sleep until a given command finished execution, then control would return to the application before the next command in the sequence is issued. The delay incurred by context switching represents an unacceptable latency for a real-time system and is likely to fail with respect to real-time processing.

In the described embodiment and for illustrative purposes, the operating system is understood to run two types of modes of operation: kernel mode and user mode. User mode is the mode all user applications and processes operate in when executing standard commands. We will be referring to user mode understanding this to be a non-privileged mode of operation. Kernel mode is the mode kernel or privileged commands operate in, such as instructions that affect memory protection, hardware and I/O operations, etc. These commands are privileged because their execution could have a disastrous effect for the overall system if not controlled strictly. For this reason, the kernel mode is also known as monitor mode or supervisor mode. In the particular context of the described embodiment, it is important to note that most system resources are controlled by using the privileged OS services and especially most I/O commands are executed at kernel mode level and in the interrupt service routine.

It should be noted that, in an alternative embodiment of the present invention, no privileged OS services are necessary and that the right to execute the commands in privileged mode would suffice in order to guarantee the real-time flow of execution of an application.

For example, in the case of the described embodiment and as it was explained above, commands, of the type issued by an application program to a video grabber, are privileged instructions and therefore should not (according to best practices) be done in user mode. Examples of such commands include acquiring frames, writing frames into memory once they are ready.

Still in the context of the described embodiment, we will refer to a device driver to mean the code that transforms user-mode application calls into kernel-mode calls, the only mode usually which can access directly hardware resources. Device drivers sometimes are packaged as .sys files, with additional routines provided as Dynamically-Linked-Library (DLL) files, allowing for a reconfigurable driver, without the need to recompile the code. There exist also virtual device drivers, used mainly to handle software interrupts from the system rather than hardware interrupts.

Still referring to FIG. 2, at the user application 2 level, the user would select a sequence of commands to be performed, group them as a set, and then request their execution. The invention offers in this case the advantage of providing a friendly user-interface allowing a user to program a sequence of commands, with, for example, a drag-and-drop programming interface. The user application 2 program calls a DLL file with the sequence of commands passed as arguments for a command dispatcher 4. The command dispatcher 4 is part of a driver 5 running in kernel mode. The command dispatcher 4 orders the received commands in a queue 6 and then calls the device driver of the hardware or a DLL to be used for command execution.

Now going back to FIG. 1, a plurality of commands is created by an application in order to grab frames and to perform various commands on them. In the described embodiment of the invention, the sequence of commands to be performed on a single image, such as grab, format conversion, filter, analyze, etc, would all be issued at once and then executed at kernel level. The desired image processing is done by the CPU in kernel mode or done autonomously using the processor associated with the hardware device itself.

In an alternative embodiment, the desired image processing will be achieved by the CPU, for example, under the control of the application program without difficulty within the time slot allotted to the user mode application program. In that situation, the commands issued and executed would only ensure that no frames are missed; the processing of the images would then be performed at user-level and later in an asynchronous manner.

In the described embodiment, as illustrated by the timeline in FIG. 1, a user mode application calls the kernel with a sequence of commands to be executed. Once in kernel mode, the command dispatcher 4 stores commands in a command queue 6. The first command will be issued and executed. When the command is finished executing, a "command complete" signal will announce to the command dispatcher 4 that the hardware 7 is available to execute another command. After another small delay of handling the signal received, known as interrupt handling time, the command dispatcher 4 will issue another command from the queue 6. The process is repeated until there are no more commands in the command queue 6.

Still in reference to FIG. 1, if the last command in the chain of commands happens to be a synchronous command, then the user-mode application will 'sleep' until this synchronous command has finished executing. When the command has finished execution, a "command complete" event will announce the dispatcher, which in turn will return control to the user-mode application. The time between the event announcing synchronous command execution and control being given back to the application is the context switch time.

It is important to note the reduction and minimizing of the idle time of the hardware, that is, the time between executing two sequential commands. Command scheduling and execution happens without interacting with the application in real-time. While at the kernel level there is a small delay between the completion of the first command and the execution of the next command, this delay is much smaller and known than the delay in switching context and restoring control to the user mode application. Indeed, instead of switching context after each execution and restoring control to the user mode application, the commands can be simply fetched from the kernel mode queue, which reduces latencies. The invention is therefore much more deterministic.

In the described embodiment, as shown in FIG. 2, the device driver 5 comprises a command dispatcher 4, a command queue 6, a target unit 8 and an interrupt handler 9. The device driver runs in kernel mode, therefore with high privilege.

A user application 2 provides a sequence of commands to the command dispatcher 4. The sequence of commands comprises a sequence of instructions to perform. The sequence of commands is preferably related to a single user application thread 2. However it will be appreciated that a plurality of user applications or threads is supported, each user application or thread of the plurality providing a corresponding sequence of instructions. In such case, preferably, a command queue 6 is dedicated for each corresponding sequence of instructions. A command of the sequence of commands may be any one of a user-synchronous command and a user-asynchronous command.

In the case in which the command is a user-synchronous command, execution of the application program thread is stopped until the given command finishes executing. The control is returned to the user application 2 once the command is completed. The application is said to be "sleeping" from the time of issuing the command to the return of control. In such case, the thread that sent the command is blocked. Image buffer allocation, image or digitizer information inquiry, processing results returning, etc, are examples of user-synchronous commands.

In the case where the command is a user-asynchronous command, control is returned to the user application 2 immediately. In such cases, the thread sending the command is not blocked. The command will be executed later or started immediately if the hardware device 7 required for its execution is free.

For instance, the user application 2 may be a video inspection application, in which case the sequence of commands provided would comprise commands used for performing a video acquisition, image analysis and process control. For example, such video inspection application may be used in a cookie manufacture conveyor belt to perform quality control operations.

In such a case, asynchronous "Grab acquisition" commands are used for transferring to memory a camera-acquired image of a cookie in digital form.

Then, asynchronous "binarize" commands are used for applying a threshold in order to decide whether each pixel relates to foreground or background information or more precisely, whether a given pixel corresponds to the cookie or not.

Then, asynchronous or synchronous "blob" commands are used in order to perform an analysis of a binary image of the cookie in order to find and compute the shape of the cookie.

Then a synchronous "get result" command will return results to the application and determine if the computed shape of the cookie is correct or not according to various application-related criteria. For instance, the cookie may be partly or entirely broken.

At this point, synchronous or asynchronous "Set I/O" commands are used in order to activate an external hardware signal or send a message on a network to communicate the results to other external devices. In the case of the cookie manufacture conveyor belt, the message may be used to actuate means for removing damaged cookies from the conveyor belt.

In the described embodiment, the command dispatcher 4 operates in kernel mode, at the Interrupt Service Routine (ISR) level, which will be explained below.

While in the described embodiment an interrupt is understood to be a hardware generated interrupt, the same effects could be achieved with a software interrupt and handler, as well as with a software sequencer. Moreover, we will use the term interrupt to designate any kind of event used for signaling the completion of a command execution.

Usually, in a non-real time operating system, the device driver is responsible for handling the interrupt generated by the hardware it controls. In the context of a Windows operating system, the process has normally two parts: the ISR and the Deferred Procedure Call (DPC). The DPCs are the instructions to be executed as a result of the interrupt, but at a lower priority than the ISR.

In the case of the invention, as a result of receiving an interrupt and being in the ISR level, the command will be executed at the same level for the most part, without deferring the procedure call. Since most of the events are dealt with at this highest-priority ISR level, only the interrupt dispatch time is to be considered as a latency factor, yielding therefore a very fast response time. As explained below, the command dispatcher 4 is used, among other things, for managing the execution of the sequence of commands provided by the user application 2.

In the described embodiment, the command queue 6 stores a plurality of commands to be executed. It will be appreciated by someone skilled in the art that a sequence of commands stored in the command queue 6 may be stored with a level of priority. Alternatively, a plurality of command queues 6 may be used, each command queue of the plurality of command queues 6 having a determined priority. The plurality of commands is stored in the command queue 6 using the command dispatcher 4. Alternatively, the command dispatcher 4 retrieves a command of the plurality of commands stored in the command queue 6.

It will be appreciated that in an alternative embodiment of the invention, the sequence of commands is provided to the command dispatcher 4 at one time only, during installation of the driver for instance. In such case, each command of the sequence of commands might be performed in loop.

The command dispatcher 4 provides the next command of the sequence of commands to a corresponding target unit 8 in response to a reception of a "command executed" signal provided by the target unit 8.

The target unit 8 may be software controlling acquisition-related hardware, processing-related hardware, input/output-related hardware, processing-related software, data transfer-related hardware/software or the like.

More precisely, the target unit 8 provides a command to execute and programs the hardware device 7 to complete the command. Upon completion of the command, the hardware device 7 triggers a "command executed" event, such as an interrupt, to an interrupt handler 9, which in turn provides to a corresponding target unit 8 a notification signal indicative of an execution of the command. At this point, the corresponding target unit 8 provides the "command executed" signal to the command dispatcher 4.

Figure 3:
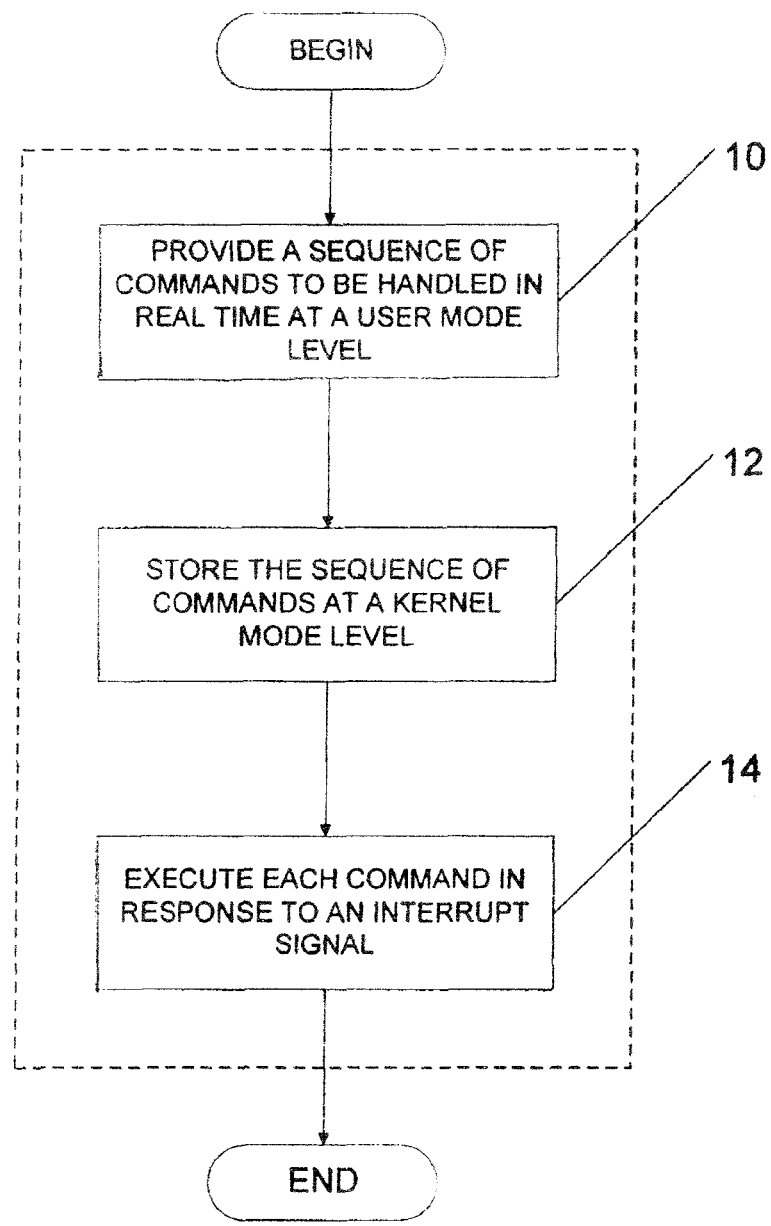
FIG. 3 is a flow chart which shows how one embodiment of the invention operates; in this embodiment, a sequence of commands is provided, stored and executed in response to an interrupt signal.

Now referring to FIG. 3, there is shown how the driver 5 operates in the described embodiment.

According to step 10, a sequence of commands to be executed in real time is provided at a user mode level by the user application 2 to the command dispatcher 4. As explained previously, each command of the sequence of commands is any one of a user-synchronous command and a user-asynchronous command.

In an alternative embodiment of the invention, the sequence of commands is provided at the user mode level by the user application 2 to the command dispatcher 4 by pushing them to the command dispatcher 4. In such a case, the user application 2 comprises a command pushing module which pushes the sequence of commands.

In another embodiment, the sequence of commands is provided at the user mode level by the user application 2 to the command dispatcher 4 by retrieving them. In such a case, the command dispatcher comprises a command receiving unit responsible for collecting the sequence of commands provided by the user application 2.

According to step 12, the provided sequence of commands is stored at a kernel mode level by the command dispatcher 4.

According to step 14, each command of the stored sequence of commands is executed, one at a time, in response to a "command executed" signal provided to the command dispatcher 4 by the target unit 8.

Figure 4:
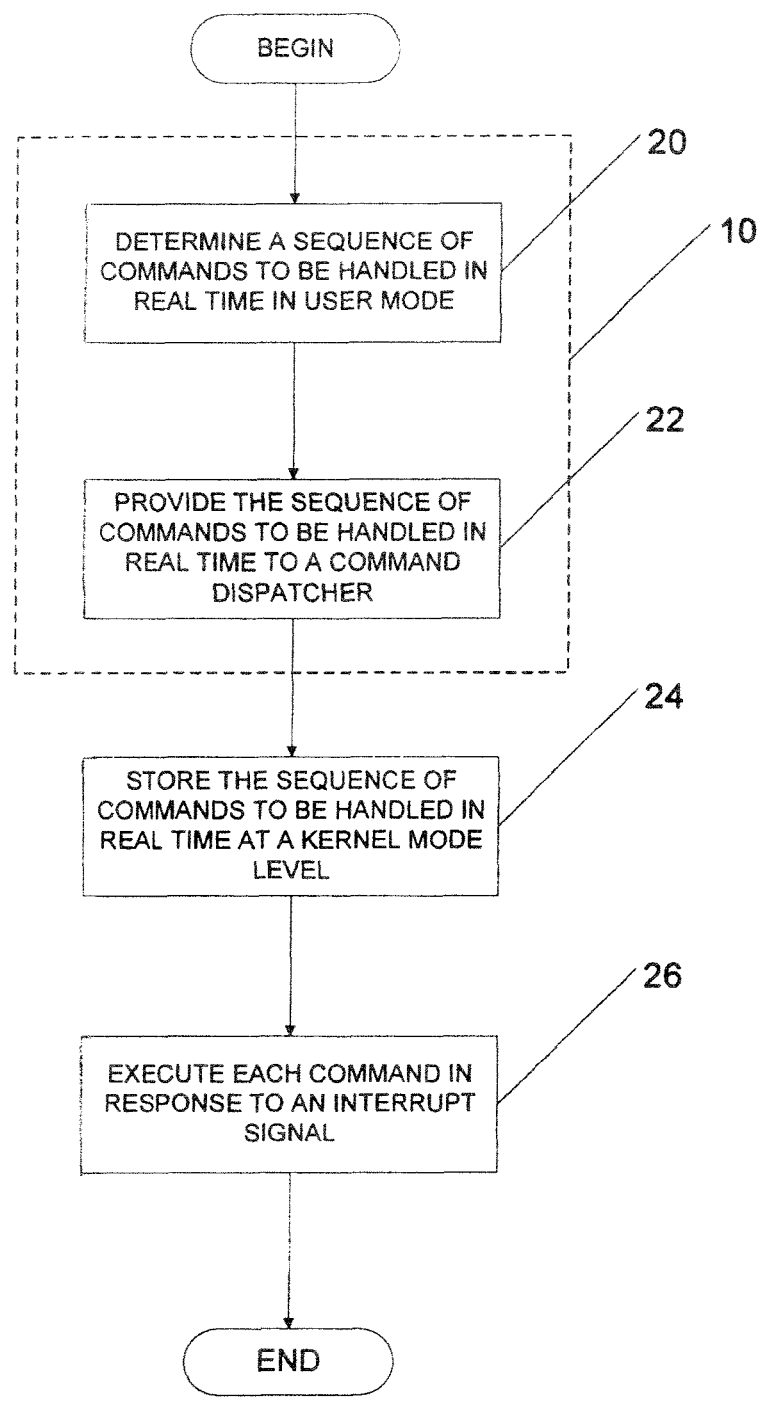
FIG. 4 is a flow chart which shows how the sequence of commands is provided; according to a first step, the sequence of commands is determined while according to a second step, the sequence of commands is provided to a command dispatcher.

Now referring to FIG. 4, there is shown how the sequence of commands to be handled in real time is provided.

According to step 20, the sequence of commands to be handled in real time is determined at the user mode level by the user application 2.

According to step 22, the sequence of commands to be handled in real time is provided to the command dispatcher 4.

According to step 24, each command of the sequence of commands to be handled in real time is stored by the command dispatcher 4 in the command queue 6.

According to step 26, each command of the sequence of commands stored is executed in response to a "command executed" signal provided to the command dispatcher 4 by the target unit 8.

Figure 5:
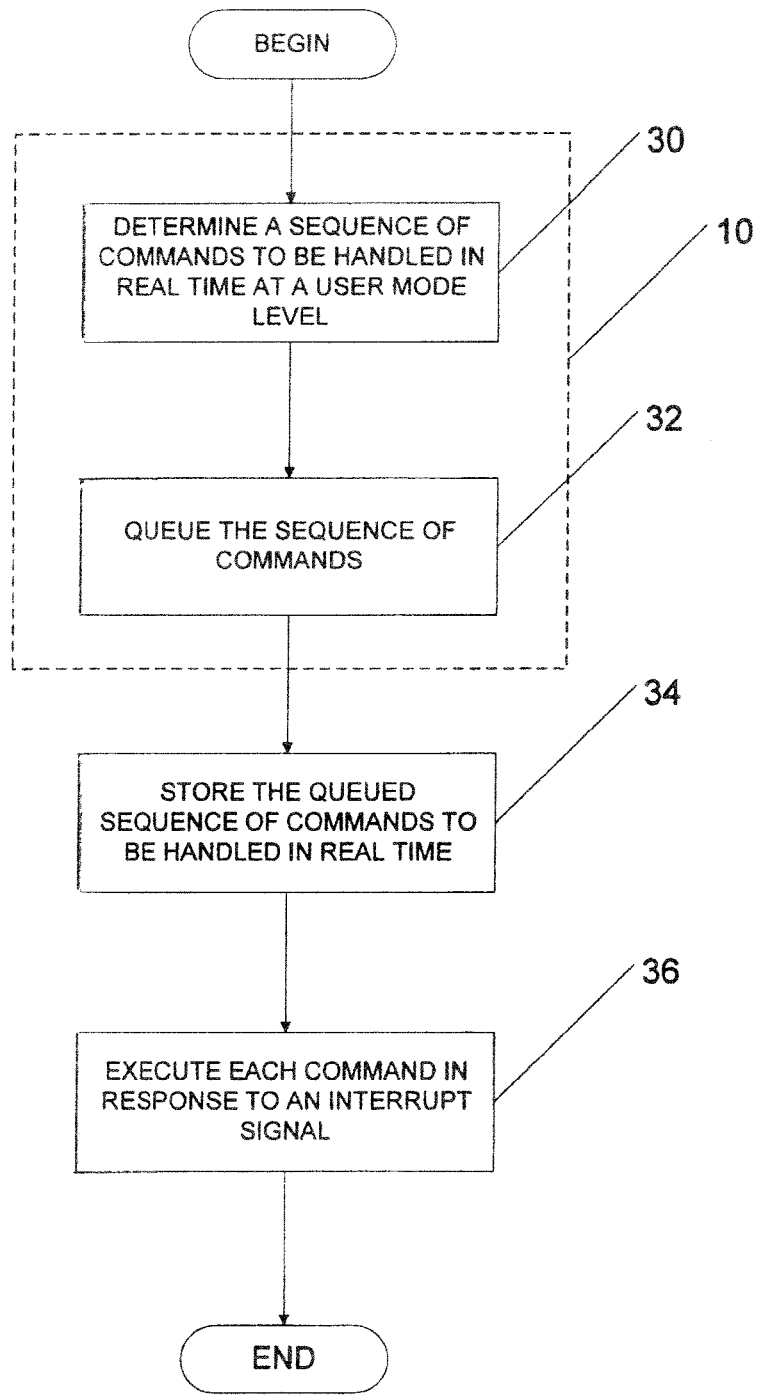
FIG. 5 is a flow chart which shows an embodiment of the invention where a sequence of commands is queued in the case where the driver comprises a command queue adapted to store a plurality of commands.

Now referring to FIG. 5, there is shown the described embodiment where each of the sequence of commands is queued using the driver 5.

According to step 30, a sequence of commands to be handled in real time is determined by the user application 2 at a user mode level.

According to step 32, the sequence of commands to be handled in real time is queued by the command dispatcher 4. In one embodiment, the sequence of commands is queued by the command dispatcher 4 with a priority provided by the user application 2. Alternatively, the sequence of commands is queued without a priority indication.

According to step 34, the sequence of commands queued by the command dispatcher 4 is stored in the command queue 6 using the command dispatcher 4. In the case where a priority indication is used, the sequence of commands queued is stored in the command queue 6 together with its corresponding priority indication.

According to step 36, the queued sequence of commands stored is executed by the target unit using the command dispatcher 4 upon receipt of an end of command event, typically.

Figure 6:
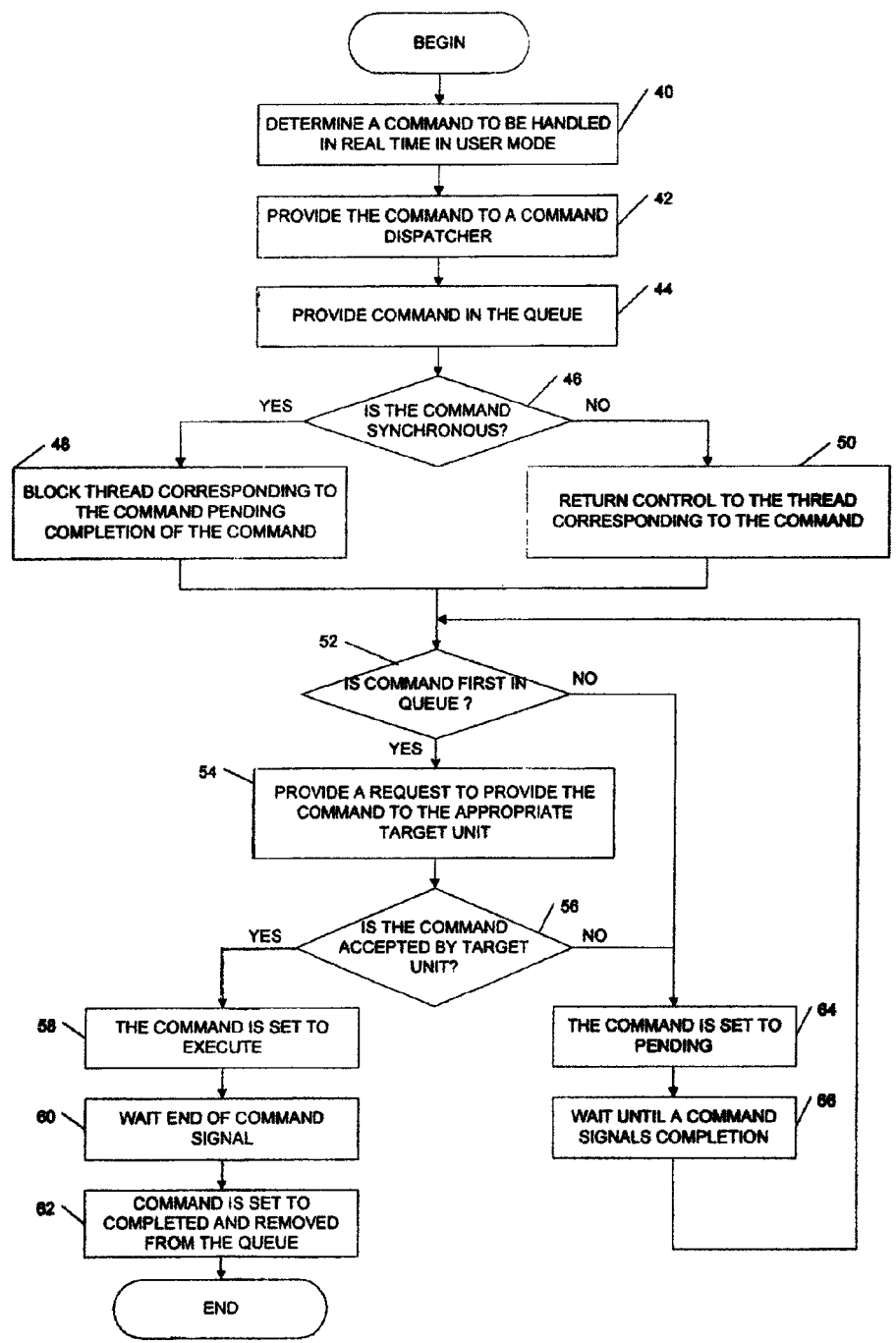
FIG. 6 is a flow chart which shows how an embodiment of the invention operates and more precisely how user-synchronous and user-asynchronous commands are preferably handled.

Now referring to FIG. 6, there is shown how the system operates for each command of the sequence of commands.

According to step 40, a command to be handled in real time is determined in user mode by the user application 2.

According to step 42, the command to be handled in real time is provided by the user application 2 to the command dispatcher 4.

According to step 44, the command is provided to a command queue 6.

According to step 46, a check is performed in order to find out if the command to be handled in real time is a user-synchronous command.

In the case in which the command is a user-synchronous command, and according to step 48, the thread corresponding to the command is blocked waiting for the command to be finished executing.

In the case where the command to be handled in real time is not a user-synchronous command, and according to step 50, control is returned to the application thread originating the command.

According to step 52, a check is performed to determine whether the command added to the queue in step 48 or 50 is the first in the queue, i.e. if there are no other commands waiting execution. If there are other commands in the queue, then the recently added command will not be executed and will be set to pending, as per step 64. Then, as per step 66, the pending command will wait for the end of a "command executed" event, such as an interrupt, following which, it will be checked if it is the first in the queue.

If the command is first in the queue, then a request will be made by the command dispatcher 4 to provide the command to the appropriate target unit, as per step 54.

According to step 56, a check is performed in order to find out if the request to provide the command to the target unit 8 is accepted by the target unit 8. In fact, the check is performed in order to find out if the target unit 8 is free.

In the case where the target unit 8 accepts the request for the command and according to step 58, the command is set to be executed by the target unit 8. Then, according to step 60, the system will wait for the "command executed" event, such as an interrupt. Following such an event, the executed command will be removed from the queue, as per step 62 and the algorithm will end.

In the case where the target unit 8 does not accept the request for the command and according to step 64, the command is set to pending by the command dispatcher 4 in the command queue 6.

In the case where the command is pending, it will have to wait, according to step 66, for receiving a "command executed" event signalling that the previous command had finished executing. After such a signal has been received, the target unit 8 is free to be allocated to a new command, so the process resumes from step 52.

Figure 7:
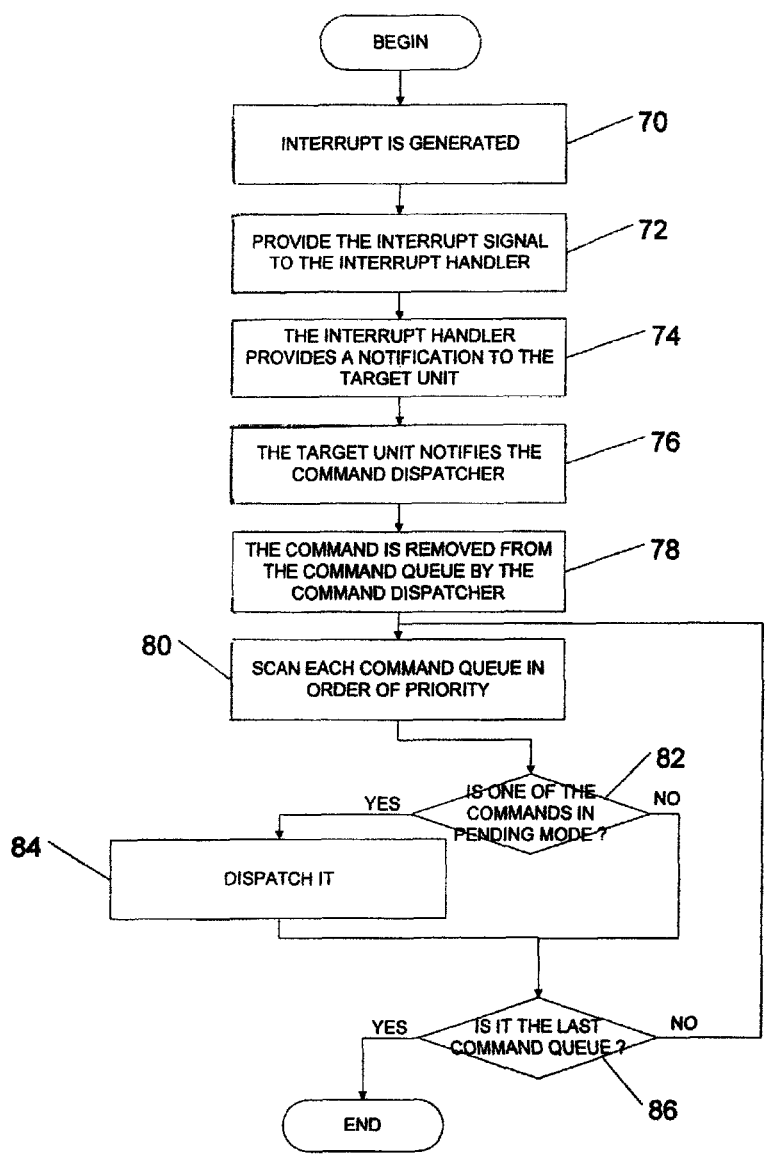
FIG. 7 is a flow chart which shows what happens when the execution of a command is completed.

Now referring to FIG. 7, there is shown the sequence of steps performed in the case in which an interrupt signal, or another "command executed" event, is generated by the hardware device 7 following the end of a command execution.

According to step 70 when an interrupt, or another "command executed" event, is generated by the hardware device 7, the Interrupt Service Routine is called to handle it.

In the case where an interrupt is generated by the hardware device 7 and according to step 72, the ISR calls the interrupt handler 9 which calls the target unit.

According to step 74, the interrupt handler 9 provides a notification indicative of the interrupt signal to the appropriate target unit 8. The notification is provided to the corresponding target unit 8 of the hardware device 7 in the case where a plurality of target units are implemented.

According to step 76, the target unit 8 notifies the command dispatcher 4 that a command was successfully executed and that in response, an interrupt signal or another "command executed" event was issued by the hardware device 7.

According to step 78, the executed command is removed from the command queue 6 by the command dispatcher 4.

According to steps 80 and 82, the command dispatcher scans each command queue in order of priority, looking for commands in pending mode. These are commands which have requested the target unit 8, while it was being used to execute a different command. Therefore, these are commands which were "ready" to execute but have been denied the hardware. Of all pending commands, the one with the highest priority will be the next one to be dispatched.

After the command has been dispatched, or if there are no pending commands in the current queue, then according to step 86, another check is performed. Another check is performed to determine whether the current queue is the last queue to be scanned. If so then the algorithm ends. If not, the algorithm proceeds by scanning the next command queue, as per step 80.

It will be appreciated that in the case where the target unit 8 receives an error from the interrupt handler 9 or in the case where the target unit 8 does not receive any notification before a predetermined timeout period, an error is logged and provided to the command dispatcher 4 which in turn will provide an indication of the error to the user application 2 thread.

Alternatively, a user may define a custom command to be executed by the target unit 8. In order to provide such custom command, the user may first program the custom command. For instance, the custom command may be used to perform a custom filtering of an image using an on-board processing engine of a frame-grabber.

Accordingly, the user may insert the custom command in the driver of the frame-grabber. More precisely, the custom command is put in a predefined user function table within the driver of the frame-grabber. The index where the function is put is used to access the custom command.

After compiling the driver with the new function inserted, the new driver is installed.

A user application may then call the custom command by specifying the index of the command in the command table. The custom command has the same advantage as any other predefined command. The custom command may therefore be queued in the command queue 6 and executed in real-time.

Note that a custom command as well as standard commands may also comprise other already defined commands. For instance, it may be possible to create a custom meta-command that will call a grab command, a processing command and a transfer command.

It will be appreciated by someone skilled in the art that conditional commands can be used to provide branching depending on certain conditions and to create commands which comprise a sequence of commands that loop for a certain amount of time. The conditional commands may be one of a branch if lower command, a branch if lower or equal command, a branch if higher command, a branch if higher or equal command, a branch if zero command and a branch if not zero command as well as any other conditional operators.

It will also be noted that such branching commands may be used to alter the flow of control of the program. For example, a branching command could return information which will affect whether the next command in the command queue 6 will be executed or whether the control will return to the user application.

The embodiments of the invention described above are intended to be exemplary only. The scope of the invention is therefore intended to be limited solely by the scope of the appended claims.

We claim:

1. In a computer system, a method for providing improved real time command execution in a non real time operating system, comprising:
   executing at least one application at a user mode level of the non real time operating system running on at least one Central Processing Unit (CPU);
   having said at least one application at said user mode level determine a sequence to be followed for a set of commands;
   providing from said at least one application said sequence of commands to a privileged mode of said non real time operating system, said sequence of commands to be executed in real time, by storing commands of said sequence of commands in a command queue accessible from the privileged mode of said non real time operating system;
   accessing the command queue from a software command dispatcher operating in the privileged mode of said non real time operating system and selecting the commands therefrom; and
   initiating one at a time, from the privileged mode of said non real time operating system using the at least one CPU and the software command dispatcher, real time execution of each of said selected commands.

2. The method as claimed in claim 1, wherein a plurality of sequences of commands is provided, each sequence of the plurality of sequences of commands being related to a corresponding application thread, further wherein said storing said commands is performed in a corresponding queue from the execution of said corresponding application thread.

3. The method as claimed in claim 2, wherein a synchronous command is added to a sequence of said plurality of sequences of commands, said corresponding application thread sleeping until said synchronous command is executed.

4. The method as claimed in claim 1, wherein a synchronous command is added to said sequence of commands, said at least one application sleeping until said synchronous command is executed.

5. The method as claimed in claim 1, wherein said storing said commands of said sequence of commands is performed through execution of a driver routine.

6. The method as claimed in claim 1, wherein at least one of said commands stored in the command queue is a branch command to control an order of execution of said stored commands.

7. The method as claimed in claim 1, wherein said initiating, one at a time, real time execution of said commands is done at an Interrupt Service Routine level of the privileged mode of the non real time operating system.

8. The method as claimed in claim 1, wherein said sequence of commands processes a same data set.

9. The method as claimed in claim 8, wherein said same data set is a video camera image being captured and processed in real time.

10. The method as claimed in claim 1, wherein said providing said sequence of commands is performed through a system call.

11. In a computer system, a method for providing improved real time command execution in a non real time operating system, comprising:
    executing at least one application at a user mode level of the non real time operating system running on at least one Central Processing Unit (CPU);
    having said at least one application at said user mode level determine a sequence of commands to be executed in real time;
    providing from said at least one application said sequence of commands to a privileged mode of said non real time operating system;
    storing commands of said sequence of commands, using a software command dispatcher, in a command queue to be accessible from the privileged mode of said non real time operating system;
    accessing the command queue from the software command dispatcher operating in the privileged mode of the non real time operating system and selecting the commands therefrom; and
    initiating one at a time, from the privileged mode of said non real time operating system and using the at least one CPU and the software command dispatcher, real time execution of each of said selected commands.

12. The method as claimed in claim 11, wherein a plurality of sequences of commands is provided, each sequence of the plurality of sequences of commands being related to a corresponding application thread, further wherein said storing said commands is performed in a corresponding queue from the execution of said corresponding application thread.

13. The method as claimed in claim 11, wherein a synchronous command is added to said sequence of commands, said at least one application sleeping until said synchronous command is executed.

14. The method as claimed in claim 12, wherein a synchronous command is added to a sequence of said plurality of sequences of commands, said corresponding application thread sleeping until said synchronous command is executed.

15. The method as claimed in claim 11, wherein said storing said commands of said sequence of commands is performed through execution of a driver routine.

16. The method as claimed in claim 15, wherein said providing said sequence of commands involves said commands being pushed one at a time through a system call.

17. The method as claimed in claim 11, wherein at least one of said commands stored in the command queue is a branch command to control an order of execution of said commands.

18. The method as claimed in claim 11, wherein said initiating, one at a time, real time execution of said selected commands is done at an Interrupt Service Routine level of the privileged mode of the non real time operating system.

19. The method as claimed in claim 11, wherein said sequence of commands processes a same data set.

20. The method as claimed in claim 19, wherein said same data set is a video camera image being captured and processed in real time.

21. The method as claimed in claim 11, wherein said providing said sequence of commands involves said commands being pushed one at a time through a system call.

22. The method as claimed in claim 11, wherein said storing said commands is performed through execution of a driver routine from a system file.

* * * * *